Figure 1:
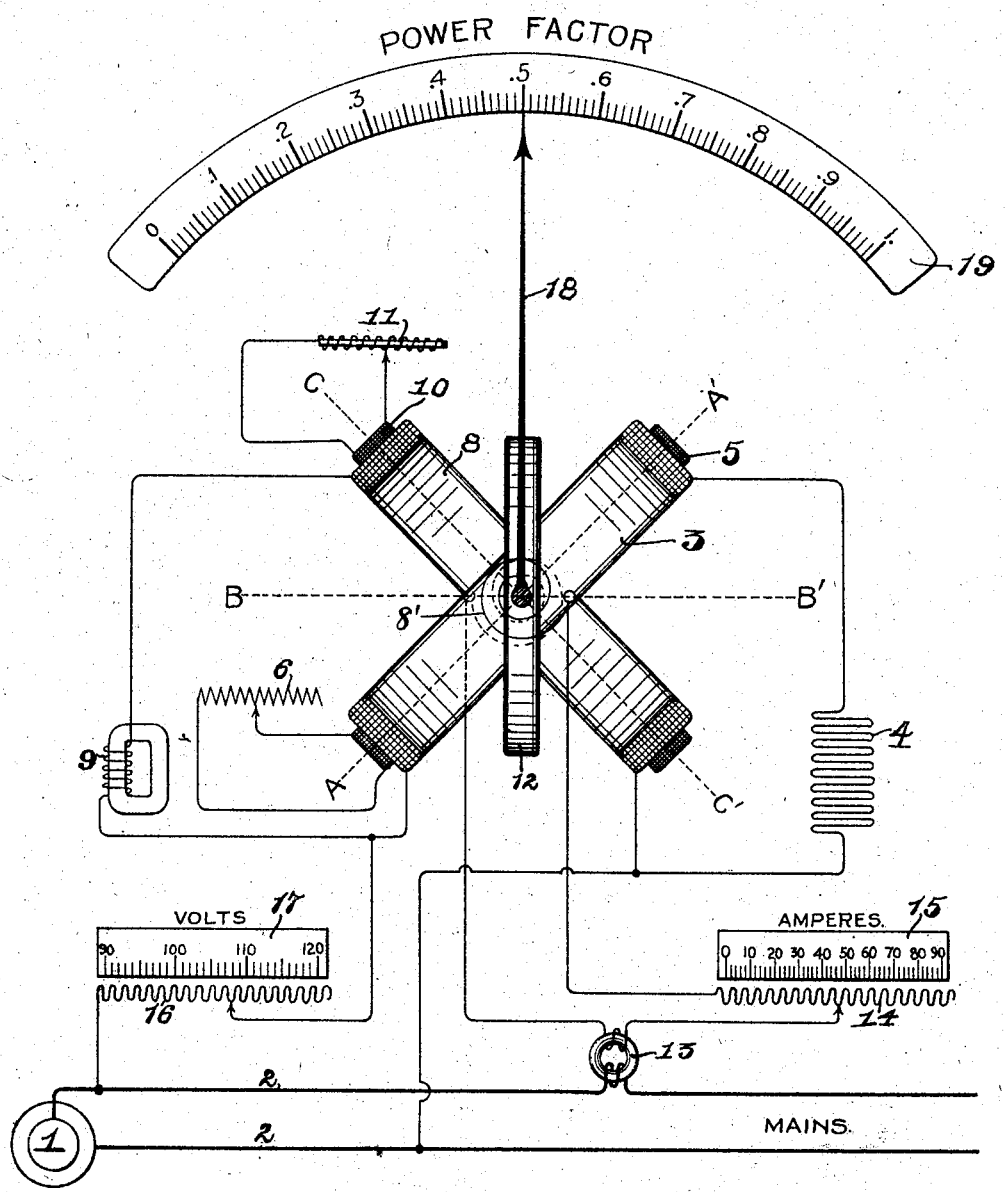

No. 796,032. PATENTED AUG. 1, 1905.
T. DUNCAN.
ELECTRICAL MEASURING INSTRUMENT.
APPLICATION FILED JUNE 26, 1901. RENEWED JAN. 7, 1905.

2 SHEETS—SHEET 1.

WITNESSES:
INVENTOR.
THOMAS DUNCAN
By Charles A Brown Cragg & Belfield
ATTORNEYS.

No. 796,032. PATENTED AUG. 1, 1905.
T. DUNCAN.
ELECTRICAL MEASURING INSTRUMENT.
APPLICATION FILED JUNE 26, 1901. RENEWED JAN. 7, 1905.

2 SHEETS—SHEET 2.

WITNESSES:

INVENTOR
THOMAS DUNCAN
By Charles A. Brown Cragg & Belfield
ATTORNEYS.

UNITED STATES PATENT OFFICE.

THOMAS DUNCAN, OF CHICAGO, ILLINOIS, ASSIGNOR TO DUNCAN ELECTRIC MANUFACTURING COMPANY, OF LAFAYETTE, INDIANA.

ELECTRICAL MEASURING INSTRUMENT.

No. 796,032.      Specification of Letters Patent.      Patented Aug. 1, 1905.

Application filed June 26, 1901. Renewed January 7, 1905. Serial No. 239,965.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to systems of alternating-current distribution, and has for its object the provision of an instrument for measuring and determining without calculation the power factor or difference in phase between the current and impressed electromotive force in working circuits. It is desirable to have the electricians at the generating-stations informed concerning the phase of the current with relation to the pressure.

Heretofore it has been the practice to determine power factors by dividing the quantity of real watts by the quantity of apparent watts. For this purpose three instruments were employed—namely, a voltmeter, an ammeter, and a wattmeter. The product of the voltmeter and the ammeter readings determined the apparent watts, which result was divided into the reading of the wattmeter to determine the power factor. This method of determining the power factor involves mental calculation and consumes time where frequently it is desired to know without delay the actual power factor of the system. I have devised an instrument which is capable of indicating directly upon a suitable reading-scale the power factor.

Generally speaking, my invention comprises a measuring element and motor means which is caused to operate upon a change in phase relation of the current and pressure to effect an actuation of the measuring element to indicate the difference of phase between the current and pressure.

In the preferred embodiment of my invention I employ two windings which are subject to the pressure of the system and which produce magnetizing effects differing in phase, preferably by ninety degrees, and a third, a current-winding, which produces a magnetic field varying in phase with the current in the system and by coaction with the pressure-fields effects a location of the measuring element that indicates upon a scale the phase relation of the current in the main circuit with the pressure impressed upon that circuit. One of the pressure-fields is preferably maintained in phase with the impressed pressure, while the other pressure-field is maintained in quadrature with the impressed pressure. I do not wish to be limited, however, in all embodiments of my invention to a quadrature relation between the fields of the pressure-windings nor to the phase relations between the pressure-fields and the pressure impressed upon the working circuit. The pressure field-windings may be stationary and the current-winding may be rotatably mounted and provided with a pointer traveling over a suitable scale, or the current-winding may be maintained stationary and the pressure-windings may be mounted to rotate upon a support, upon which pressure windings or support the indicating pointer or needle may be secured.

I will explain my invention more fully by reference to the accompanying drawings, in which—

Figure 2:
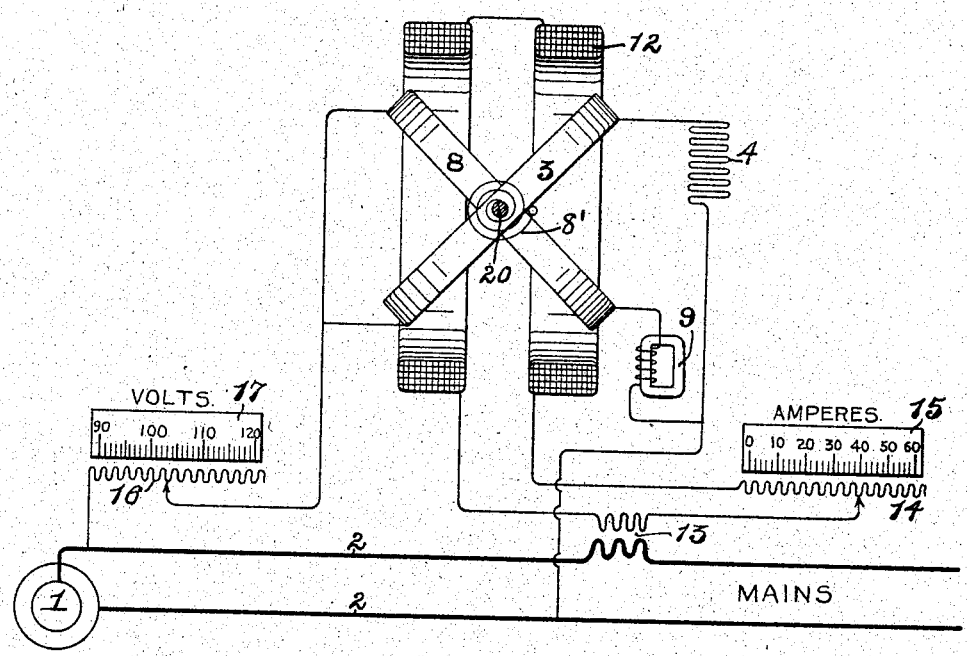
Figure 3:
Figure 4:
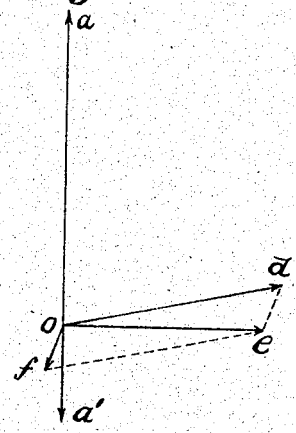

Figure 1 is a diagrammatic view of an alternating-current system of distribution, illustrating a power-factor indicator connected therewith having stationary pressure field-coils. Fig. 2 is a view of an alternating-current system of transmission having a power-factor indicator connected therewith provided with movable pressure field-coils. Fig. 3 is a vector diagram illustrating graphically the manner in which the field due to one of the pressure-windings is brought into phase with the impressed pressure. Fig. 4 is a vector diagram illustrating the manner in which the field due to the remaining pressure-winding is brought into quadrature with the pressure.

Like parts are indicated by similar characters of reference throughout the views.

I have illustrated an alternating-current generator 1, that supplies alternating current to transmission-mains 2 2, that extend from the generator to districts of consumption. The power-factor indicator is usually placed at the central station.

Referring more particularly to Fig. 1, the coil 3 is connected in bridge of the mains, a non-inductive resistance 4 being included in the same bridge with the coil 3, by means of which resistance the current through the coil is caused to approach closely the pressure in phase. To secure exact coincidence in phase between the magnetism due to this pressure-winding and the impressed pressure, a coil 5 in secondary relation to the coil 3 and included in a closed local circuit with reactance, preferably in the form of resistance 6, is employed. As an alternative for adjusting the phase of the current in the closed coil 5 reactance in the form of inductance 7 may be included in circuit therewith. The adjustment of the phase of the current in coil 3 with respect to the impressed pressure is illustrated in the vector diagram Fig. 3, wherein $o\,a$ represent the impressed pressure; $o\,b$, the current in and magnetism due to coil 3; $o\,a'$, the secondary electromotive force in the coil 5; $o\,c$, the secondary current in and magnetism due to the coil 5, and $o\,g$ the resultant magnetism which is in phase with the impressed electromotive force $o\,a$. The other shunt or pressure field-coil 8 has its current lagging nearly ninety degrees behind the line-pressure. This coil 8 is also connected in bridge of the mains and includes in series with it in the same bridge an impedance-coil 9, which causes the current in said coil 8 to lag as near ninety degrees as possible. To obtain a magnetism that lags exactly ninety degrees with respect to the impressed pressure, I employ a winding 10 in secondary relation to coil 8 and adjust the inductive resistance 11 included in circuit therewith until quadrature is obtained. This is illustrated by the vector diagram Fig. 4, in which $o\,a$ indicates the impressed pressure; $o\,d$, the current in and magnetism due to coil 8; $o\,a'$, the secondary electromotive force of the coil 10; $o\,f$, the secondary current in and magnetism due to coil 10; $o\,e$, the resultant magnetism of the currents $o\,d$ and $o\,f$ in quadrature with the impressed pressure.

By means of the coils 8 and 3 and their accessories there is produced magnetism represented by the magnetic axial line C C' due to the coil 3 that is in phase with the impressed pressure and a magnetism represented by the magnetic axial line A A' due to coil 8 that is in quadrature with the impressed pressure. The current-winding 12 when movable has current supplied to it by means of suitable springs in a well-known way, which springs 8' 8' constitute the terminals of the winding, to which terminals current is preferably led from the secondary of a transformer 13, which current-winding produces magnetism having a shifting axis B B'. While these springs 8' 8' might be made very slender, so as to exert practically no restraining torque to the motion of the current-coil, (or pressure windings, if they constitute the movable member,) it is found desirable in practice to make these springs of sufficient torsional strength to exert a slight restraining and steadying influence upon the movable member. On account of this torque exerted by the springs the current-coil under given conditions will not come to rest in the position determined by the interacting forces of the current and pressure windings alone—that is to say, if the magnetizations set up by these windings were such as to of themselves turn the pointer through an angle of thirty degrees from its normal position the pointer will not be turned through so large an angle as thirty degrees on account of the restraining torque exerted by the springs—and the stronger the springs the greater the difference between the angle determined by the magnetizations and that actually taken by the pointer. Now if for any given springs the strength of the magnetizations of the coils or any of the coils be increased there will be a greater torsional moment tending to overcome the restraining torque of the springs, and therefore the pointer will be turned through a greater angle than when the magnetizations are weaker. Having then a scale graduated for any given current strength through the current and pressure coils of the instrument, it will be apparent that in order to obtain absolutely accurate readings it will be necessary to have a constant current flowing through the windings when a reading is taken, irrespective of the pressure or current strength in the system to which the instrument is applied—that is to say, whenever it is desired to take a reading it will be necessary by some means always to bring the current flowing through the coils to some certain given strength before the reading is taken. To maintain this constancy of current, I employ a graduated resistance or rheostat 14 in series with the current-winding, more or less of which may be switched into or out of circuit, according to the amount of current in the line. This resistance should be adjusted by placing the switch opposite the scale-mark upon the scale 15 that corresponds to the indication of current in the line upon an ammeter. For example, if the current in the main line is thirty amperes the switch or pointer of the rheostat 14 is moved to the mark "30" on the ampere-scale 15. If upon taking another reading the current has reached forty, the rheostat switch or pointer should be moved to the scale-mark "40" upon the ampere-scale, thereby increasing the amount of resistance 14 included with the current-winding 12 and maintaining the current in this winding at its proper value. The current in the pressure-windings should also be maintained of uniform value, for which purpose a resistance or rheostat 16 is associated with a volt-scale 17, the resistance 16 being included in a conductor that is common to both pressure-circuits, so that one adjustment of the resistance will effect a duplicate adjustment of the current flowing through the pressure-windings. As the pressure is increased the amount of resistance 16 in the pressure-circuits should be increased. Whenever a reading, therefore, is to be taken, the rheostat 14 has its arm placed opposite the scale-mark upon the ampere-scale 15 that corresponds to the current in the line, while the rheostat 16 has its arm adjusted to correspond to the scale-mark upon the volt-scale 17 that indicates the pressure in the line, so that the coils of the instrument always have the same magnetizing effect when readings are taken, the actuation of the movable member of the instrument then depending solely upon the phase relations of the magnetism due to the current-windings with respect to the magnetic fields due to the pressure-windings.

In Fig. 1 the current-winding 12 is movable and has rigidly attached thereto an indicating-needle 18, provided at its free end with a pointer that travels along a power-factor scale 19.

In Fig. 2 I have illustrated a modification wherein the current-winding 12 is subdivided into two coils and is fixed, while the pressure-windings 3 and 8 are fixed with relation to each other, but movable with a common shaft 20, to which it is understood a pointer, similar to pointer 18, is attached. When the current and pressure are in phase, the maximum or one-hundred-per-cent. power factor is secured. When this condition exists, the magnetic fields due to the coils 12 and 3 are in phase and the magnetic axes B B' and C C' are caused to coincide, whereby the pointer 18 is rotated to the right until it registers with scale-mark "1," indicating that the angle of lag is zero and that there is one-hundred-per-cent. power factor. If the current should lag ninety degrees behind the pressure, the magnetic fields due to the coils 8 and 12 would be in phase and the magnetic axes A A' and B B' would coincide, whereby the needle is shifted toward the left until it registered with the scale-mark "0," indicating the greatest angle of lag and a power factor of zero. If there is a phase difference between the current and pressure of eighty-four degrees plus, the indicator 18 will register at approximately ".1," indicating a power factor of ten per cent. If there should be a phase difference of seventy-eight degrees plus, the needle 18 will register at ".2," indicating a power factor of twenty per cent. Phase angles seventy-two degrees plus, sixty-six degree plus, sixty degrees plus, fifty-three degrees plus, forty-five degrees plus, thirty-six degrees plus, and twenty-five degrees plus correspond approximately with power factors ".3," ".4," ".5," ".6," ".7," ".8," and ".9." A reading of the power-factor scale therefore not only indicates the actual power factor, but may serve to indicate the phase angle between the current and pressure in the working circuit.

I have shown one means for preserving the required ratio between the magnetizing effects of the windings of the motor member to produce a uniform effective torque to secure the same movement of the indicator for currents of different volume and pressure in which the current and pressure have the same relative phase—that is, the means illustrated serve to prevent the indications of the instrument from being affected by variations in the current and pressure, the movement of the indicator being solely effected by means of a variation in phase relation of the current and pressure. Other means for maintaining this desired relation of the magnetizing effects of the meter-windings may be employed without departing from the spirit of my invention.

While I have herein shown and particularly described the preferred embodiment of my invention, it is obvious that changes may be readily made without departing from the spirit thereof, and I do not, therefore, wish to be limited to the precise construction herein disclosed; but,

Having thus described my invention, I claim as new, and desire to secure by Letters Patent, the following:

1. The combination with an alternating-current system of distribution, of two pressure-windings producing fields in quadrature with each other and supplied with current from the said system, a current-winding supplied with current from the said system, a measuring element subjected to the torque of the said current and pressure windings to indicate the phase difference between the current and pressure in the system, and means for maintaining the current in the pressure and current windings uniform, irrespective of the voltage and current in the working circuit, substantially as described.

2. The combination with an alternating-current system of distribution, of two pressure-windings producing fields in quadrature with each other and supplied with current from the said system, a current-winding supplied with current from the said system, the current-winding being movable with relation to the pressure-windings, while the pressure-windings are fixed with relation to each other, a measuring element mounted upon the movable member of the instrument and serving to indicate the phase difference between the current and pressure in the system, and means for maintaining the current in the pressure and current windings uniform, irrespective of the voltage and current in the working circuit, substantially as described.

3. In an instrument of the class described, the combination with pressure-windings adapted to produce fields in quadrature, a current-winding, means whereby the magnetism due to the current-winding is in phase with that due to one of the pressure-windings when the current and pressure in the working circuit are in phase, and whereby the magnetism due to the current-winding is in phase with the remaining pressure-winding when the current and pressure are ninety degrees out of phase, a movable measuring element subject to the torque between the windings of the meter, serving to indicate the phase difference between the current and pressure, and means whereby the magnetic fields due to the currents in the current and pressure windings may be maintained constant irrespective of the voltage and current in the working circuit, substantially as described.

4. In an instrument of the class described, the combination with relatively fixed pressure-windings adapted to produce fields in quadrature, a current-winding relatively movable with respect to the pressure-windings, means whereby the magnetism due to the current-winding is in phase with that due to one of the pressure-windings when the current and pressure in the working circuit are in phase, and whereby the magnetism due to the current-winding is in phase with that due to the remaining pressure-winding when the current and pressure are ninety degrees out of phase, a measuring element movable with the current or pressure windings to indicate the phase difference between the current and pressure in the working circuit, and means whereby the magnetic fields due to the currents in the current and pressure windings may be maintained constant irrespective of the voltage and current in the working circuit, substantially as described.

5. The combination with an alternating-current system of distribution, of a measuring element, means operated by the current in the system for effecting movement thereof to indicate the difference in phase between the current and pressure, and means whereby the indications of said measuring element may be independent of variations of current and pressure of the system, substantially as described.

6. The combination with an alternating-current system of distribution, of current and pressure field-windings energized by the current in the system, a movable measuring element, the said windings exerting torque upon the movable measuring element to indicate the phase difference between the current and the pressure in the system, and means whereby the indications of said measuring element may be independent of variations of current and pressure of the system, substantially as described.

7. The combination with an alternating-current system of distribution, of two pressure-windings producing fields in quadrature with each other and supplied with current from the said system, a current-winding supplied with current from the said system, a measuring element subjected to the torque of the said current and pressure windings to indicate the phase difference between the current and pressure in the system, and means whereby the indications of said measuring element may be independent of variations of current and pressure of the system, substantially as described.

8. The combination with an alternating-current system of distribution, of current and pressure field-windings energized by the current in the system, creating fields out of phase, a movable measuring element to indicate the phase difference between the current and the pressure in the system, and means whereby the indications of said measuring element may be independent of variations of current and pressure of the system, substantially as described.

9. The combination with an alternating-current system of distribution, of two pressure-windings producing fields out of phase and supplied with current from the said system, a current-winding supplied with current from the said system, a measuring element subjected to the torque of the said current and pressure windings to indicate the phase difference between the current and pressure in the system, and means whereby the indications of said measuring element may be independent of variations of current and pressure of the system, substantially as described.

10. The combination with an alternating-current system of distribution, of current and pressure field-windings energized by the current in the system, a movable measuring element, the said windings exerting torque upon the movable measuring element to indicate the phase difference between the current and the pressure in the system, and means whereby the indications of said measuring element may be independent of variation of current and pressure of the system, the current-winding being movable with relation to the pressure-windings, the indicating element of the meter traveling with the movable winding, substantially as described.

11. The combination with an alternating-current system of distribution, of two pressure-windings producing fields in quadrature with each other and supplied with current from the said system, a current-winding supplied with current from the said system, a measuring element subjected to the torque of the said current and pressure windings to indicate the phase difference between the current and pressure in the system, and means whereby the indications of said measuring element may be independent of variations in the current and pressure of the system, the current-winding being movable with relation to the pressure-windings, the indicating element of the meter traveling with the movable winding, substantially as described.

12. The combination with an alternating-current system of distribution, of current and pressure field-windings energized by the current in the system, creating fields out of phase, a movable measuring element to indicate the phase difference between the current and the pressure in the system, and means whereby the indications of said measuring element may be independent of variations in the current and pressure of the system, the current-winding being movable with relation to the pressure-windings, the indicating element of the meter traveling with the movable winding, substantially as described.

13. The combination with an alternating-current system of distribution, of two pressure-windings producing fields out of phase and supplied with current from the said system, a current-winding supplied with current from the said system, a measuring element subjected to the torque of the said current and pressure windings to indicate the phase difference between the current and pressure in the system, and means whereby the indications of said measuring element may be independent of variations in the current and pressure of the system, the current-winding being movable with relation to the pressure-windings, the indicating element of the meter traveling with the movable winding, substantially as described.

14. In an instrument of the class described, the combination with pressure field-windings producing fields differing in phase, of a current field-winding, an indicating element actuated by the windings of the instrument, and rheostats in circuit with the current and pressure windings for adjusting the currents in these windings with respect to the current and pressure in the system associated with the meter, substantially as described.

15. In an instrument of the class described, the combination with pressure-windings producing fields differing in phase, of a current field-winding, an indicating element actuated by the windings of the instrument, and means for adjusting the current in these windings to compensate for variation in pressure and current of the work-circuit, substantially as described.

16. The combination with an alternating-current system of distribution, of a current-winding and a pressure-winding receiving current from the said system, an indicating device actuated upon variation in phase between the fields produced by the said windings to indicate the phase displacement between the current and pressure in the system, and means whereby the required magnetizing effects in the current and pressure windings are secured to eliminate the effects due to variation in the conditions of the circuit, substantially as described.

17. The combination with an alternating-current system of distribution, of a current-winding and a pressure-winding receiving current from the said system and producing fields coinciding in phase when the current and pressure in the system are coincident in phase, an indicating device actuated upon variation in phase between the fields produced by the said windings to indicate the phase displacement between the current and pressure in the system, and means whereby the required magnetizing effects in the current and pressure windings are secured to eliminate the effects due to variation in the load conditions of the circuit, substantially as described.

18. The combination, in an alternating-current system of distribution, of a measuring element, means operated by the current in the system for effecting movement thereof to indicate the difference in phase between the current and pressure, and adjustable resistances included in circuit with said measuring element and said means, substantially as described.

19. The combination, with an alternating-current system of distribution, of current and pressure field-windings energized by the current in the system, a movable measuring element, the said windings exerting torque upon the movable measuring element to indicate the phase difference between the current and pressure in the system, and an adjustable resistance included in series with said field-windings, substantially as described.

20. The combination with an alternating-current system of distribution, of two pressure-windings producing fields in quadrature with each other and supplied with current from the said system, a current-winding supplied with current from the said system, a measuring element subjected to the torque of the said current and pressure windings to indicate the difference between the current and pressure in the system, and adjustable rheostats included in series with said windings, substantially as described.

21. The combination with an alternating-current system of distribution, of two pressure-windings producing fields in quadrature with each other and supplied with current from the said system, a current-winding supplied with current from the said system, the current-winding being movable with relation to the pressure-windings while the pressure-windings are fixed with relation to each other, a measuring element mounted upon the movable element of the instrument and serving to indicate the phase difference between the current and pressure in the system, and adjustable rheostats associated with said current and pressure windings, substantially as described.

22. The combination with an alternating-current system of distribution, of current and pressure field-windings energized by the current in the system, a movable measuring instrument, the said windings exerting torque upon the movable measuring element to indicate the phase difference between the current and pressure in the system, and means for maintaining the current in the current and pressure windings uniform, irrespective of the voltage and current in the working circuit, substantially as described.

23. The combination with an alternating-current system of distribution, of two pressure-windings producing fields out of phase and supplied with current from the said system, a current-winding supplied with current from the said system, a measuring element subjected to the torque of the said current and pressure windings to indicate the phase difference between the current and pressure in the system, and means for maintaining the current in the pressure and current windings uniform irrespective of the voltage and current in the working circuit, substantially as described.

24. The combination with an alternating-current system of distribution, of two pressure-windings producing fields in quadrature with each other and supplied with current from the said system, a current-winding supplied with current from the said system, a measuring element subjected to the torque of the said current and pressure windings to indicate the phase difference between the current and pressure in the system, and means for maintaining the ratio between the currents in the current and pressure field-windings irrespective of the voltage in the system, substantially as described.

25. The combination with an alternating-current system of distribution, of current and pressure field-windings energized by the agency of the current in the system, a movable measuring element, the said windings exerting torque upon the movable measuring element to indicate the phase difference between the current and the pressure in the system, and means for maintaining the ratio between the current and the pressure windings irrespective of changes in the system, substantially as described.

26. The combination with an alternating-current system of distribution, of current and pressure field-windings energized by the agency of the current in the system, a movable measuring element, the said windings exerting torque upon the movable measuring element to indicate the phase difference between the current and the pressure in the system, and means for preventing modification in the operation of the instrument by changes in load conditions, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL.